US006427303B1

(12) United States Patent
McConnell et al.

(10) Patent No.: US 6,427,303 B1
(45) Date of Patent: Aug. 6, 2002

(54) GLOW PLUG PULLING DEVICE

(76) Inventors: Robert McConnell; Bruce McConnell, both of 618 W. Rosewood Ct., Ontario, CA (US) 91762

( * ) Notice: Subject to any disclaimer, the term of this patent is extended or adjusted under 35 U.S.C. 154(b) by 0 days.

(21) Appl. No.: 09/649,883

(22) Filed: Aug. 28, 2000

(51) Int. Cl.[7] .................................................. B23P 19/04

(52) U.S. Cl. .......................................................... 29/255

(58) Field of Search .......................... 29/254, 255, 275, 29/263, 264, 282, 283; 279/43.1, 2.02

(56) References Cited

U.S. PATENT DOCUMENTS

| | | | | | |
|---|---|---|---|---|---|
| 3,750,500 | A | * | 8/1973 | Peterson | 29/255 |
| 3,910,476 | A | * | 10/1975 | Zajac | 279/1 L |
| 4,034,594 | A | * | 7/1977 | Morgan | 29/255 |
| 4,936,003 | A | * | 6/1990 | Gloe | 29/254 |

* cited by examiner

*Primary Examiner*—Robert C. Watson
(74) *Attorney, Agent, or Firm*—Goldstein & Lauas, P.C.

(57) ABSTRACT

A glow plug pulling device including an elongated shaft having a threaded inner end portion and a smooth outer end portion. The smooth outer end portion has a hammer stop fixedly secured thereto. A collet is coupled with respect to the threaded inner end portion of the elongated shaft. The collet has an outer end having an internally threaded aperture for coupling with the threaded inner end portion of the elongated shaft. The collet has a hex shaped open inner end for engaging the hex shaped outer free end of the glow plug. The collet has a compression sleeve secured thereto intermediate the outer end and inner end thereof. A slide hammer is slidably disposed on the smooth outer end portion of the elongated shaft. The slide hammer has an open inner end dimensioned for receiving and engaging the compression sleeve of the collet therein. The slide hammer has a knurled outer surface.

2 Claims, 1 Drawing Sheet

GLOW PLUG PULLING DEVICE

BACKGROUND OF THE INVENTION

The present invention relates to a glow plug pulling device and more particularly pertains to extracting expanded glow plugs from their respective ports.

The use of extraction devices is known in the prior art. More specifically, extraction devices heretofore devised and utilized for the purpose of extracting items from fixed positions are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,802,692 to Philippe discloses an extracting tool comprised of an elongated sleeve with a jaw assembly capable of removing a glow plug by rotation of the sleeve to produce a pulling force. U.S. Pat. No. Des. 370,608 to Wagner discloses the ornamental design for a glow plug pulling device. U.S. Pat. No. Des. 365,972 to Mills discloses the ornamental design for an arrowhead extractor.

While these devices fulfill their respective, particular objective and requirements, the aforementioned patents do not describe a glow plug pulling device for extracting expanded glow plugs from their respective ports.

In this respect, the glow plug pulling device according to the present invention substantially departs from the conventional concepts and designs of the prior art, and in doing so provides an apparatus primarily developed for the purpose of extracting expanded glow plugs from their respective ports.

Therefore, it can be appreciated that there exists a continuing need for a new and improved glow plug pulling device which can be used for extracting expanded glow plugs from their respective ports. In this regard, the present invention substantially fulfills this need.

SUMMARY OF THE INVENTION

In the view of the foregoing disadvantages inherent in the known types of extraction devices now present in the prior art, the present invention provides an improved glow plug pulling device. As such, the general purpose of the present invention, which will be described subsequently in greater detail, is to provide a new and improved glow plug pulling device which has all the advantages of the prior art and none of the disadvantages.

To attain this, the present invention essentially comprises an elongated shaft having a threaded inner end portion and a smooth outer end portion. The smooth outer end portion has a cylindrical hammer stop fixedly secured thereto. A collet is coupled with respect to the threaded inner end portion of the elongated shaft. The collet has an outer end having an internally threaded aperture for coupling with the threaded inner end portion of the elongated shaft. The collet has a hex shaped open inner end for engaging the hex shaped outer free end of the glow plug. The collet has a compression sleeve secured thereto intermediate the outer end and inner end thereof. The compression sleeve is defined by peripheral ridges. A slide hammer is slidably disposed on the smooth outer end portion of the elongated shaft. The slide hammer has an open inner end dimensioned for receiving and engaging the compression sleeve of the collet therein. The slide hammer has a knurled outer surface.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved glow plug pulling device which has all the advantages of the prior art extraction devices and none of the disadvantages.

It is another object of the present invention to provide a new and improved glow plug pulling device which may be easily and efficiently manufactured and marketed.

It is a further object of the present invention to provide a new and improved glow plug pulling device which is of durable and reliable construction.

An even further object of the present invention is to provide a new and improved glow plug pulling device which is susceptible of a low cost of manufacture with regard to both materials and labor, and which accordingly is then susceptible of low prices of sale to the consuming public, thereby making such a glow plug pulling device economically available to the buying public.

Even still another object of the present invention is to provide a new and improved glow plug pulling device for extracting expanded glow plugs from their respective ports.

Lastly, it is an object of the present invention to provide a new and improved glow plug pulling device including an elongated shaft having a threaded inner end portion and a smooth outer end portion. The smooth outer end portion has a hammer stop fixedly secured thereto. A collet is coupled with respect to the threaded inner end portion of the elongated shaft. The collet has an outer end having an internally threaded aperture for coupling with the threaded inner end portion of the elongated shaft. The collet has a hex shaped open inner end for engaging the hex shaped outer free end of the glow plug. The collet has a compression sleeve secured thereto intermediate the outer end and inner end thereof. A slide hammer is slidably disposed on the smooth outer end portion of the elongated shaft. The slide hammer has an open inner end dimensioned for receiving and engaging the compression sleeve of the collet therein. The slide hammer has a knurled outer surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figures 1, 2:
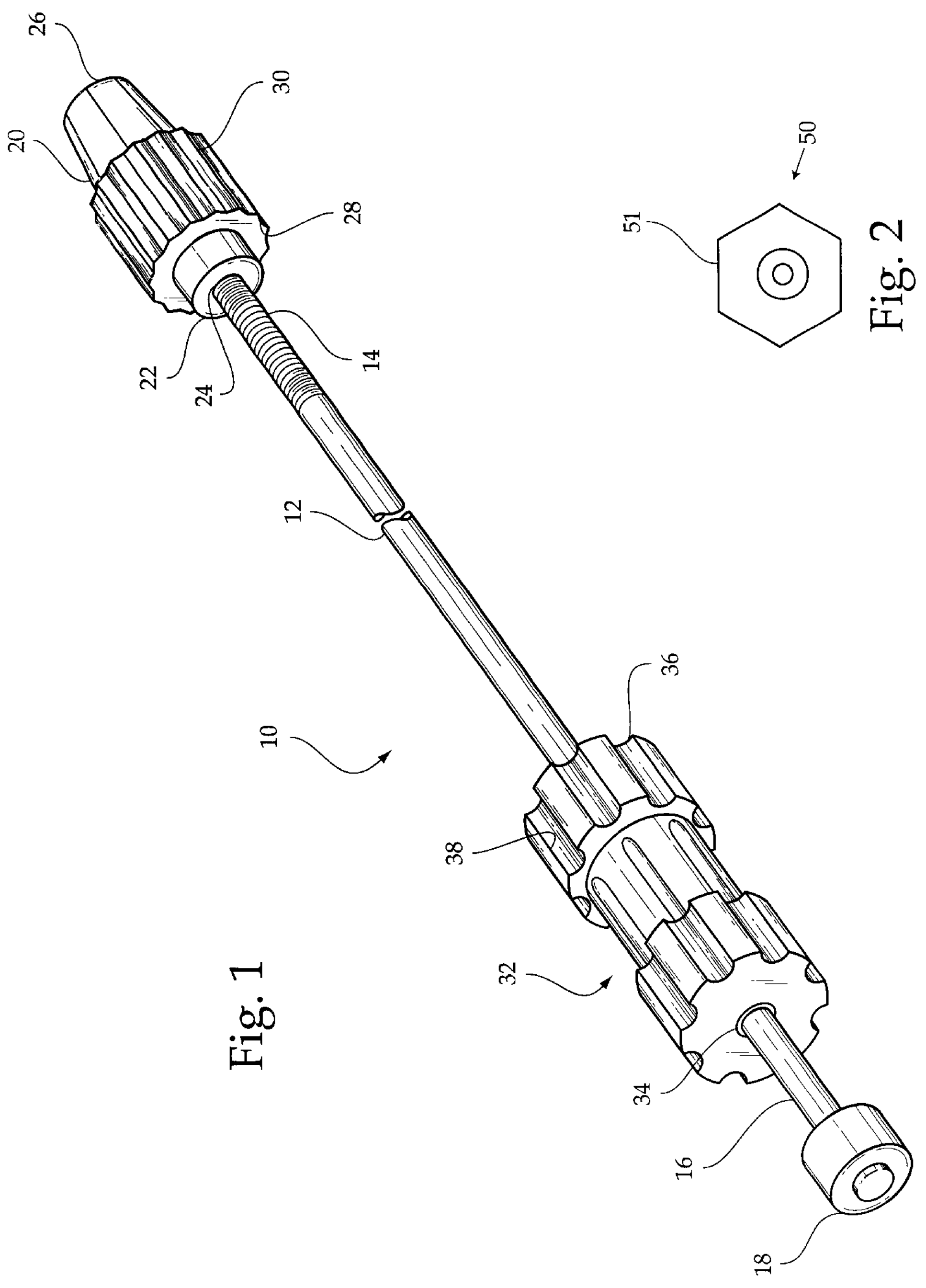
FIG. 1 is a perspective view of the preferred embodiment of the glow plug pulling device constructed in accordance with the principles of the present invention.
FIG. 2 is an end view of a typical glow plug which may be pulled in accordance with the present invention.

With reference now to the drawings, and in particular, to FIG. 1 thereof, the preferred embodiment of the new and improved glow plug pulling device embodying the principles and concepts of the present invention and generally designated by the reference number 10 will be described.

Specifically, it will be noted in FIG. 1 that the device relates to a glow plug pulling device for extracting expanded glow plugs from their respective ports. In its broadest context, the device consists of an elongated shaft, a collet, and a slide hammer. Such components are individually configured and correlated with respect to each other so as to attain the desired objective.

The present invention is used for the extracting of glow plugs from an engine. As shown in FIG. 2, a typical glow plug 50 is provided with a hex shaped outer end 51 that can be reached without removing the engine head.

The elongated shaft 12 has a threaded inner end portion 14 and a smooth outer end portion 16. The smooth outer end portion 16 has a cylindrical hammer stop 18 fixedly secured thereto. The elongated shaft 12 has an overall length of about eighteen inches.

The collet 20 is coupled with respect to the threaded inner end portion 14 of the elongated shaft 12. The collet 20 has an outer end 22 having an internally threaded aperture 24 for coupling with the threaded inner end portion 14 of the elongated shaft 12. The collet 20 has a hex shaped open inner end 26 for engaging the hex shaped outer free end of the glow plug. The collet 20 has a compression sleeve 28 secured thereto intermediate the outer end 26 and inner end 22 thereof. The compression sleeve 28 is defined by peripheral ridges 30.

The slide hammer 32 is slidably disposed on the smooth outer end portion 16 of the elongated shaft 12. The slide hammer 32 is provided with a central aperture 34 that receives the elongated shaft 12. The central aperture 34 allows the slide hammer 32 to slide freely with respect to the elongated shaft 12.

The slide hammer 32 has an open inner end 36 dimensioned for receiving and engaging the compression sleeve 28 of the collet 20 therein. The slide hammer 32 has a knurled outer surface 38 to allow the slide hammer 32 to be easily handled and maneuvered.

In use the device 10 is positioned with respect to the engine whereby the hex shaped open inner end 26 of the collet 20 is frictionally engaged to the outer free end of the glow plug. The user then positions the slide hammer 32 over the compression sleeve 28. Next, the user will pull outwardly on the slide hammer 32 to try and remove the glow plug from the engine. If the slide hammer 32 releases the compression sleeve 28, the stop hammer 18 will stop the outward movement of the slide hammer 32. The device 10 is then re-positioned on the outer free end of the glow plug until its removal from the engine is achieved.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A glow plug pulling device for extracting expanded glow plugs from their respective ports, wherein the glow plugs having hex shaped outer free ends, the pulling device comprising, in combination:

an elongated shaft having a threaded inner end portion and a smooth outer end portion, the smooth outer end portion having a cylindrical hammer stop fixedly secured thereto;

a collet coupled with respect to the threaded inner end portion of the elongated shaft, the collet having an outer end having an internally threaded aperture for coupling with the threaded inner end portion of the elongated shaft, the collet having a hex shaped open inner end for engaging the hex shaped outer free end of the glow plug, the collet having a compression sleeve secured thereto intermediate the outer end and inner end thereof, the compression sleeve being defined by peripheral ridges; and a slide hammer slidably disposed on the smooth outer end portion of the elongated shaft, the slide hammer having an open inner end dimensioned for receiving and engaging the compression sleeve of the collet therein, the slide hammer having a knurled outer surface.

2. A glow plug pulling device for extracting expanded glow plugs from their respective ports, wherein the glow plugs having hex shaped outer free ends, the pulling device comprising, in combination:

an elongated shaft having a threaded inner end portion and a smooth outer end portion, the smooth outer end portion having a hammer stop fixedly secured thereto;

a collet coupled with respect to the threaded inner end portion of the elongated shaft, the collet having an outer end having an internally threaded aperture for coupling with the threaded inner end portion of the elongated shaft, the collet having a hex shaped open inner end for engaging the hex shaped outer free end of the glow plug, the collet having a compression sleeve secured thereto intermediate the outer end and inner end thereof; and a slide hammer slidably disposed on the smooth outer end portion of the elongated shaft, the slide hammer having an open inner end dimensioned for receiving and engaging the compression sleeve of the collet therein.

* * * * *